(12) United States Patent
Kreuder et al.

(10) Patent No.: US 9,062,185 B2
(45) Date of Patent: Jun. 23, 2015

(54) PROCESS FOR PRODUCTION OF POLYMER NANOCOMPOSITES

(75) Inventors: Carsten Kreuder, Sarnia (CA); Adam Gronowski, Sarnia (CA); John Lovegrove, Sarnia (CA); Hanns-Ingolf Paul, Leverkusen (DE); Rolf Feller, Mettmann (DE); Dana Adkinson, London (CA); Phil Magill, London (CA)

(73) Assignee: LANXESS INTERNATIONAL SA, Granges Paccot (CH)

( * ) Notice: Subject to any disclaimer, the term of this patent is extended or adjusted under 35 U.S.C. 154(b) by 301 days.

(21) Appl. No.: 13/522,760

(22) PCT Filed: Jan. 17, 2011

(86) PCT No.: PCT/EP2011/050506
§ 371 (c)(1),
(2), (4) Date: Mar. 8, 2013

(87) PCT Pub. No.: WO2011/089084
PCT Pub. Date: Jul. 28, 2011

(65) Prior Publication Data
US 2013/0178577 A1 Jul. 11, 2013

(30) Foreign Application Priority Data
Jan. 20, 2010 (EP) .................................. 10000568

(51) Int. Cl.
*C08L 9/00* (2006.01)
*B60C 1/00* (2006.01)
(Continued)

(52) U.S. Cl.
CPC ... *C08L 9/00* (2013.01); *B60C 1/00* (2013.01); *B82Y 30/00* (2013.01); *C08F 210/12* (2013.01); *C08J 5/005* (2013.01); *C08J 2323/28* (2013.01); *C08J 2323/36* (2013.01); *Y02T 10/862* (2013.01)

(58) Field of Classification Search
CPC .......... B60C 1/00; C08J 5/005; B82Y 30/00; C08L 9/00; C08F 8/22; C08F 210/12; C08F 8/40
USPC ......................................................... 524/574
See application file for complete search history.

(56) References Cited

U.S. PATENT DOCUMENTS 4,057,681 A 11/1977 Gorbaty
5,021,509 A 6/1991 Keller et al.
(Continued)

FOREIGN PATENT DOCUMENTS

CA 1019095 10/1977
EP 0053585 A2 6/1982
WO WO 2010006983 A1 * 1/2010

OTHER PUBLICATIONS

Hexane Product Information by Sigma Aldrich. Obtained Sep. 11, 2014 at http://www.sigmaaldrich.com/chemistry/solvents/hexane-center.html.*
(Continued)

*Primary Examiner* — Ling Choi
*Assistant Examiner* — Lanee Reuther

(57) ABSTRACT

The invention relates to a processes for preparing nanocomposites comprising rubber ionomers which were prepared by an energy efficient, environmentally favorable process that uses a common medium for solution polymerization, bromination of rubber and optionally subsequent polymer nanocomposite formation. Polymer nanocomposites according to the present invention exhibit high oxygen impermeability.

17 Claims, 1 Drawing Sheet

(51) Int. Cl.
*B82Y 30/00* (2011.01)
*C08J 5/00* (2006.01)
*C08F 210/12* (2006.01)

(56) References Cited

U.S. PATENT DOCUMENTS

| | | |
|---|---|---|
| 7,019,063 B2 | 3/2006 | Wada et al. |
| 7,446,151 B2 | 11/2008 | Resendes et al. |
| 7,915,333 B2 | 3/2011 | Resendes et al. |
| 8,198,379 B2 | 6/2012 | Parent et al. |
| 2008/0207815 A1* | 8/2008 | Resendes et al. .............. 524/445 |
| 2009/0182095 A1 | 7/2009 | Resendes et al. |
| 2009/0299000 A1 | 12/2009 | Resendes et al. |
| 2010/0010140 A1 | 1/2010 | Resendes et al. |
| 2010/0036037 A1 | 2/2010 | Osman et al. |

OTHER PUBLICATIONS

International Search Report from EPO application No. EP10000568.5 dated Jun. 21, 2010.
Chu, C.Y. and Vukov, R., "Determination of the Structure of Butyl Rubber by NMR Spectroscopy" Macromolecules 1985, pp. 1423-1430, 18, American Chemical Society.
Parent, J. Scott et al., "Isobutylene-based ionomer composites: siliceous filler reinforcement", Polymer 45, pp. 8091-8096, 2004, Elsevier Ltd.
Morton, Maurice, "Butyl and Halobutyl Rubbers", Rubber Technology, Third Edition, pp. 297-300, 1987, Van Nostrand Reinhold Company, New York.
Parent, J. Scott et al., "Synthesis and Characterization of Isobutylene-Based Ammonium and Phosphonium Bromide Ionomers", Macromolecules 2004, pp. 7477-7483 37, American Chemical Society.
Encyclopedia of Polymer Science and Engineering, vol. 4 (Compounding) pp. 66-79, John Wiley & Sons, 1986, New York.

* cited by examiner

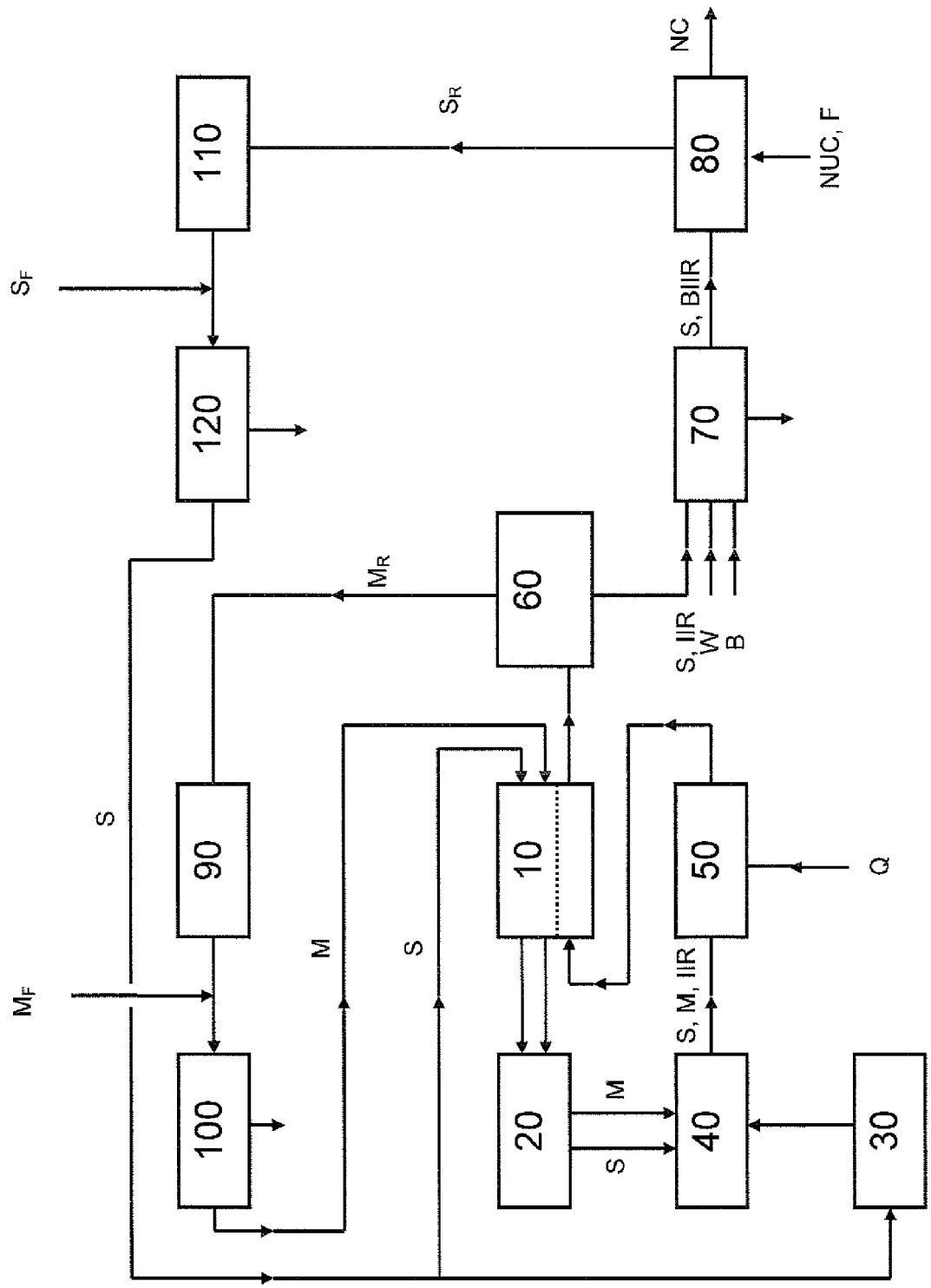

PROCESS FOR PRODUCTION OF POLYMER NANOCOMPOSITES

FIELD OF THE INVENTION

The invention relates to a process for preparing polymer nanocomposites comprising butyl rubber ionomers which were prepared by an energy efficient, environmentally favourable process that uses a common medium for solution polymerization, bromination of rubber and optionally subsequent polymer nanocomposite formation. Polymer nanocomposites according to the present invention exhibit high oxygen impermeability.

BACKGROUND

The term "butyl rubber" as used herein generally means and encompasses co-polymers of $C_4$ to $C_7$ isoolefins, $C_4$ to $C_{14}$ conjugated dienes and optionally other co-polymerizable monomers, if not defined otherwise. The term "bromobutyl rubber" as used herein generally means and encompasses brominated butyl rubbers if not defined otherwise. An illustrative and preferred example of butyl rubber is a rubber obtained by co-polymerization of isoprene and isobutylene, which is hereinafter also referred to as IIR. Its brominated analogue is also referred to as BIIR.

Poly(isobutylene-co-isoprene), or IIR, is a synthetic elastomer commonly known as butyl rubber which has been prepared since the 1940's through the random cationic copolymerization of isobutylene with small amounts of isoprene. The resulting commercially available IIR, has a multiolefin content of between 1 and 2 mol %. As a result of its molecular structure, the IIR possesses superior air impermeability, a high loss modulus, oxidative stability and extended fatigue resistance (see Chu, C. Y. and Vukov, R., Macromolecules, 18, 1423-1430, 1985).

It has been shown that treatment of bromobutyl rubber with nitrogen and/or phosphorus based nucleophiles leads to the generation of ionomers with interesting physical and chemical properties, which are dependent inter alia on their initial isoprene content (see EP 1 922 361 A, EP 1 913 077 A, Parent, J. S.; Liskova, A.; Whitney, R. A.; Parent, J. S.; Liskova, A.; Resendes, R. Polymer 45, 8091-8096, 2004, Parent, J. S.; Penciu, A.; Guillen-CasteUanos, S. A.; Liskova, A.; Whitney, R. A. Macromolecules 37, 7477-7483, 2004.

Polymer nanocomposites is a rapidly expanding, multidisciplinary field that represents a radical alternative to conventional-filled polymers or polymer blends. Polymer nanocomposites are typically formed by the incorporation of nanosized fillers into a ionomer matrix. Hybrid materials reinforced with neat and/or organically modified high aspect ratio plate-like fillers represent the most widely studied class of nanocomposites. Strong interfacial interactions between the dispersed layers and the polymer matrix lead to enhanced mechanical and barrier properties over the conventional composite. Among the many areas of polymer nanocomposites research, the tire industry has become particularly interested in high aspect ratio fillers. Recent studies have shown that the addition of high aspect ratio fillers in tire inner liner formulations have shown an increase in impermeability of up to 40% (see, for example, U.S. Pat. No. 7,019,063 and EP 1 942 136 A).

Maximizing high aspect ratio fillers to their highest potential requires the correct morphology, making the selection of both the polymer and the filler critical. Polymer intercalation into the platelet galleries, delamination and exfoliation of the platelet and the anisotropic alignment of plates in the rubber matrix must be achieved. In order to accomplish at the very least the intercalation and delamination, it is advantageous to establish a chemical link between the polymer matrix and the filler surface.

The ionomers, in particular the butyl ionomers, used to prepare polymer nanocomposites are typically prepared in a multistep procedure comprising a slurry polymerization, solution halogenation and a kneading reaction to form the ionomers and the nanocomposites.

In the conventional slurry process for producing bromobutyl rubber, isobutylene and isoprene monomers are first polymerized in a polar halohydrocarbon medium, such as methyl chloride with an aluminum based initiating system, typically either aluminum trichloride ($AlCl_3$) or ethyl aluminum dichloride ($EtAlCl_2$). The butyl rubber does not appreciably dissolve in this polar medium, but is present as suspended particles and so this process is normally referred to as a slurry process. Residual monomers and polymerization medium are then steam stripped from the butyl rubber, before it is dissolved in a bromination medium, typically a non-polar medium such as hexane. The bromination process ultimately produces the final brominated product. The conventional process therefore employs separate polymerization and bromination steps employing two different media. The use of a polar medium for polymerization and a non-polar medium for bromination necessitates intermediate stripping and dissolving steps and is inefficient from an energy point of view.

The step of separating the monomers and methyl chloride from the butyl polymer is conducted before bromination in order to avoid the formation of highly toxic byproducts from the reaction of bromine with residual monomers. The normal boiling points of the components used in the process are: methyl chloride, $-24°$ C.; isobutylene, $-7°$ C.; and, isoprene, $34°$ C. Any stripping process that removes the heavier of the residual monomers (isoprene) will also remove essentially all of the methyl chloride and isobutylene. The process of removing all of the un-reacted components from the rubber slurry requires significant amounts of energy. The greater molecular weight (and therefore higher boiling point) of the brominated monomers also precludes the removal of these species following the bromination process.

Solution processes for the polymerization of butyl rubber have been known for many years and are practiced commercially in Russia. An example of the solution process is described in CA 1,019,095, which discloses the use of iso-pentane as the preferred polymerization medium. The polymers produced using the above process are non-halogenated. Although bromination could theoretically take place in iso-pentane, the presence of residual monomers (isobutylene and isoprene) would lead to formation of the afore-mentioned undesirable by-products during bromination. The removal of the un-reacted monomers is the challenge for such a process and has not been resolved yet. Although it would be desirable to remove the monomers by distillation, the boiling point of iso-pentane ($28°$ C.) is lower than that of the heavier residual isoprene monomer ($34°$ C.), therefore this kind of separation is impossible. Even if pure n-pentane (boiling point $36°$ C.) were used as the medium, the difference in boiling points would be insufficient to allow effective removal of the isoprene using distillation techniques. As a result, the residual monomers and medium would all have to be stripped together from the butyl rubber, as in the slurry process, with the rubber being subsequently re-dissolved for bromination. This is, in fact, more energy intensive than bromination from the conventional slurry process. The use of iso-pentane as a common medium for producing bromobutyl rubber is therefore not practical using the conventional solution process.

It is known in the art to use hexane i.e. a C6 medium as a polymerization medium in the solution process. However, the viscosity of a polymer solution is strongly dependent upon the viscosity of the medium used. Because the viscosity of a C6 medium is much higher than that of a C5 medium, for a given molecular weight and polymer solids level, the resulting viscosity of the polymer solution is also much higher. This limits polymer solids content to relatively low levels when C6 is used as a solvent, since otherwise the solution becomes too viscous for good heat transfer, pumping and handling. The overall economics of a process depend strongly on the level of polymer solids in the solution or suspension emerging from the polymerization reactor; higher solids levels mean higher conversion and improved economics. In order to make material having a sufficiently high molecular weight for commercial purposes, it is necessary in butyl polymerization to employ relatively low temperatures, often less than −80° C. These low temperatures exacerbate the problem of high solution viscosity and lead to even lower solids levels. In the solution process, it is therefore quite difficult to achieve an economic solids level (conversion) at the desired temperature (molecular weight) when using hexane as a solvent due to high viscosity.

In U.S. Pat. No. 5,021,509 a process is disclosed whereby product from the conventional slurry polymerization process is mixed with hexane to produce a crude rubber solution or cement. The hexane is added to the methyl chloride-rubber slurry after exiting the polymerization reactor in order to dissolve the rubber in hexane while still finely divided and suspended in the methyl chloride/monomer mixture. A distillation process is then used to remove methyl chloride and residual isobutene and isoprene monomers for recycle, leaving just the rubber in a hexane solution ready for halogenation. This so-called "solvent replacement" process still requires that all of the original media left with the rubber after the polymerization stage are removed. The energy requirement is essentially the same as in the conventional process. No common solvent is employed for both polymerization and bromination.

Consequently, there still remains a need for an efficient, environmentally favourable process for the preparation of brominated rubbers which may then be further converted to nanocomposites.

SUMMARY OF THE INVENTION

There is now provided a process for the preparation of polymer nanocomposites comprising at least the steps of:
a) providing a reaction medium comprising
  a common aliphatic medium comprising at least 50 wt.-% of one or more aliphatic hydrocarbons having a boiling point in the range of 45° C. to 80° C. at a pressure of 1013 hPa, and
  a monomer mixture comprising at least one monoolefin monomer, at least one multiolefin monomer and either no or at least one other co-polymerizable monomer in a mass ratio of monomer mixture to common aliphatic medium of from 40:60 to 95:5, preferably from 50:50 to 85:15 and more preferably from 61:39 to 80:20;
b) polymerizing the monomer mixture within the reaction medium to form a rubber solution comprising a rubber polymer which is at least substantially dissolved in the medium comprising the common aliphatic medium and residual monomers of the monomer mixture;
c) separating residual monomers of the monomer mixture from the rubber solution to form a separated rubber solution comprising the rubber polymer and the common aliphatic medium,
d) brominating the rubber polymer in the separated rubber solution to obtain a solution comprising the brominated rubber polymer and the common aliphatic medium,
e) reacting the brominated rubber polymer obtained in step d) with at least one nitrogen and/or phosphorous containing nucleophile and
f) adding a filler to the ionomer obtained in step e) and mixing the filler and the ionomer to form an uncured nanocomposite and
g) optionally curing the nanocomposite.

The scope of the invention encompasses any possible combination of definitions, parameters and illustrations listed herein whether in general or within areas of preference.

As used herein the term "at least substantially dissolved" means that at least 70 wt.-%, preferably at least 80 wt.-%, more preferably at least 90 wt.-% and even more preferably at least 95 wt.-% of the rubber polymer obtained according to step b) are dissolved in the medium.

In an embodiment of the invention the polymerization according to step b) and the provision of a solution according to step a) is effected using a solution polymerization reactor. Suitable reactors are those known to the skilled in the art and including flow-through polymerization reactors.

The present invention advantageously provides polymer nanocomposites having reduced gas permeability and/or superior tensile strength. The nanocomposites of the present invention are particularly useful in, for example, tire inner liner applications.

Step c) of the process may employ distillation to separate un-reacted residual monomers, i.e. the isoolefin monomers and the multiolefin monomers from the medium. This mitigates the formation of undesirable halogenation byproducts from the unreacted monomers. The process is conducted at a moderate or relatively high ratio of monomers to the common aliphatic medium. Typically, the isoolefin monomers have a significantly lower viscosity than the common aliphatic medium and therefore, a higher monomer level results in a lower overall viscosity. Overall energy efficiency and raw material utilization of the process is improved by eliminating the need to separate the rubber from a first diluent or solvent used for polymerization, then re-dissolve it in a second solvent for bromination and by recycling bromides resulting from bromination back to a brominating agent. The integrated process according to the invention therefore provides improved energy and raw material efficiency and a reduction in the number of process steps as compared with conventional non-integrated processes for making brominated butyl rubber.

BRIEF DESCRIPTION OF THE DRAWING

Having summarized the invention, preferred embodiments thereof will now be described with reference to FIG. 1 which shows a process flow diagram for a process according to the present invention that employs purification and optional recycle of un-reacted monomers following separation thereof from the polymer solution.

DETAILED DESCRIPTION

Referring to FIG. 1, a solution polymerization reactor 40 is provided with a feed of monomers M, comprising isoprene and isobutylene, and a feed of the common aliphatic medium S via an optional heat exchanger 10, preferably a recuperative heat exchanger, and feed cooler 20. The monomers may either be pre-mixed with the common aliphatic medium or mixed within the polymerization reactor 40. A catalyst solution, comprising a carbocationic initiator-activator system of the type used for butyl polymerizations (e.g. a trivalent metal species, such as aluminium(organo)halides, and a small amount of water), is pre-mixed with the common aliphatic medium S in a catalyst preparation unit 30 and also introduced to the reactor 40. The solution polymerization is then allowed to occur within the polymerization reactor 40. Solution polymerization reactors 40 of a type suitable for use in the present integrated process, along with process control and operating parameters of such reactors, are described, for example, in EP 0 053 585, which is herein incorporated by reference. Conversion is allowed to proceed to the desired extent and then a reaction stopping agent, for example water or an alcohol such as methanol, is added and mixed into the reactor discharge stream comprising the common aliphatic medium S, un-reacted monomers M and butyl rubber DR in mixer 50. The resulting polymer solution comprising un-reacted monomers M i.e. isoprene and isobutylene, the common aliphatic medium S and butyl rubber IIR is passed through a recuperative heat exchanger 10 where it is warmed by the incoming feeds to the reactor, while at the same time helping to cool these feeds before they enter the final feeds cooler 20. The warmed polymer solution is then directed to a distillation column 60 for removal of the un-reacted monomers. Once the un-reacted monomers have been separated as recycling stream $M_R$, they exit from the top of the column 60 and the separated polymer solution (S, IIR) exits from the bottom of the column 60 to a solution bromination reactor 70. Additional common aliphatic medium S and/or water W may be provided to the bromination reactor 70 in order to provide the desired conditions for bromination. It is important to note that the same common aliphatic medium used for polymerization accompanies the butyl rubber through the process to bromination and that there is no need to separate the polymer from the solvent prior to bromination. A feed of a bromination agent B (as described hereinafter) is also provided to the bromination reactor 70. The brominated butyl rubber (BIIR) exits the reactor in solution (S, BIIR) and is then converted to the corresponding ionomers (ION) and further to the corresponding nanocomposites (NC), typically after neutralization and washing using reactor 80, by addition of a nitrogen and/or phosphorous containing nucleophile NUC and a filler F either in solution or after removal of the common aliphatic medium. The nanocomposite (NC) obtained thereby is then subjected to common finishing and drying procedures. The common aliphatic medium removed either before forming the ionomers and/or the nanocomposites or during said finishing step is sent as recycling stream $S_R$ to solvent recovery 110 prior to introduction to solvent purification section 120. Additional common aliphatic medium $S_F$ may be added before purification 120 or afterwards, if the medium has already been pre-purified. The purified common aliphatic medium is recycled back to the recuperative heat exchanger 10 and final feed cooler 20 for re-use in the process. The un-reacted monomers separated from the polymer solution in the distillation column 60 are sent as recycle stream $M_R$ to monomer recovery unit 90 and are then purified in monomer purification section 100 prior to being recycled back to the recuperative heat exchanger 10 and feed cooler 20. Additional fresh monomers $M_F$ may be added either prior to monomer purification 100 or afterwards, if the monomers have been pre-purified. The use of a common aliphatic medium for both polymerization and bromination and optionally even for the conversion to ionomers reduces environmental impact and improves economic performance of the integrated process as compared with conventional approaches.

The description of the process given hereinabove is exemplary and can be applied to all common aliphatic media compositions as well as to all monomer and product compositions mentioned herein.

It is within the scope of the present invention that the composition of the common aliphatic medium may have a slightly varying composition before and after removal of the un-reacted monomers due to different boiling points of its components.

The monomer mixture used to produce the rubber polymer by solution polymerization is not limited to a specific isoolefin, provided that the individual monomers have boiling points lower than 45° C. at 1013 hPa, preferably lower than 40° C. at 1013 hPa, and the monomer mixture has a viscosity less than the common aliphatic medium. However, isoolefins within the range of from 4 to 5 carbon atoms, such as isobutene, 2-methyl-1-butene, 3-methyl-1-butene, 2-methyl-2-butene or mixtures thereof are preferred. The most preferred isoolefin is isobutene.

The monomer mixture is not limited to a specific multiolefin, provided that the individual monomers have boiling points lower than 45° C. at 1013 hPa, preferably lower than 40° C. at 1013 hPa, and the monomer mixture has a viscosity less than the common aliphatic medium. Multiolefins that are known by those skilled in the art to be co-polymerizable with the isoolefins mentioned above can be used. However, multi-olefins comprising dienes, in particular conjugated dienes, within the range of from 4 to 5 carbon atoms, such as isoprene, butadiene or mixtures thereof are preferably used. The most preferred multiolefin is isoprene.

In one embodiment, the monomer mixture for the preparation of the rubber polymer, preferably butyl rubber, may comprise in the range of from 80.0% to 99.5%, preferably 92.0% to 99.5% by weight of at least one, preferably one iso-olefin monomer and in the range of from 0.5% to 20.0%, preferably 0.5% to 8.0% by weight of at least one, preferably one multiolefin monomer. More preferably, the monomer mixture comprises in the range of from 95.0% to 98.5% by weight of at least one, preferably one iso-olefin monomer and in the range of from 1.5% to 5.0% by weight of at least one, preferably one multiolefin monomer. Most preferably, the monomer mixture comprises in the range of from 97.0% to 98.5% by weight of at least one, preferably one isoolefin monomer and in the range of from 1.5% to 3.0% by weight of at least one, preferably one multiolefin monomer.

In a preferred embodiment of the invention the ranges given above apply to monomer mixtures wherein the isoolefin is isobutene and the multiolefin is isoprene.

In one embodiment, the multiolefin content of butyl rubbers produced according to the invention is for example in the range of 0.5 mol % to 20.0 mol %, preferably 0.5 mol % to 8.0 mol %, more preferably in the range of 1.0 mol % to 5.0 mol %, yet more preferably in the range of 1.5 mol % to 5 mol %, even more preferably in the range of 1.8 mol % to 2.2 mol %.

In another embodiment, the multiolefin content of butyl rubbers produced according to the invention is for example preferably in the range of 3.5 mol % to 20.0 mol %, more preferably 3.5 mol % to 6.0 mol % and even more preferably in the range of 3.5 mol % to 5.0 mol %.

One of the ways in which the aforementioned viscosity problems have been overcome is by selecting a high ratio of monomers to solvent in the polymerization step. Although mass ratios of up to 60:40 monomers to aliphatic hydrocarbon solvent have been used in the prior art, in one aspect the present invention utilizes higher ratios, for example from 61:39 to 80:20, preferably from 65:35 to 70:30. The presence of higher monomer levels, which are predominantly C4 compounds and have lower viscosity than the common aliphatic medium, reduces the solution viscosity to tolerable limits and also permits a higher solids level to be achieved during polymerization. Use of higher monomer levels also allows an acceptable molecular weight to be reached at a higher temperature than when lower levels of monomer are employed. The use of higher temperature in turn reduces solution viscosity and permits greater polymer solids level in the solution.

Another one of the ways in which the aforementioned viscosity problems have been overcome is by selecting the common aliphatic medium as a solvent. A solvent having a higher content or consisting of compounds having a boiling point of less than 45° C. or less at 1013 hPa would have a boiling point such close to the monomers that there separation from the solution would result in significant solvent removal.

The use of a solvent having a higher content or consisting of compounds having a boiling point of more than 80° C. at 1013 hPa would cause difficulties in the separation from the rubber after bromination. The solution viscosity provided by use of such solvents is also significantly higher than with the common aliphatic medium, making the solution more difficult to handle and impeding heat transfer in the reactor, even when provided with the high monomer to solvent ratios described above.

In a preferred embodiment of the invention the common aliphatic medium comprises at least 80 wt.-% of one or more aliphatic hydrocarbons having a boiling point in the range of 45° C. to 80° C. at a pressure of 1013 hPa, preferably at least 90 wt.-%, even more preferably at least 95 wt.-% and yet even more preferred at least 97 wt.-%. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

The common aliphatic medium may, for example further comprise other compounds which are at least substantially inert under polymerization conditions such as other aliphatic hydrocarbons like for example heptanes and octanes having a boiling point of more than 80° C. at a pressure of 1013 hPa, propanes, butanes, n-pentane, cyclohexane as well as halohydrocarbons such as methylchloride and other chlorinated aliphatic hydrocarbons which are at least substantially inert under reaction conditions as well as hydrofluorocarbons whereby hydrofluorocarbons are for example those represented by the formula: $C_xH_yF_z$ wherein x is an integer from 1 to 20, alternatively from 1 to preferably from 1 to 3, wherein y and z are integers and at least one.

In another preferred embodiment of the invention the common aliphatic medium is substantially free of halohydrocarbons.

As used herein the term "substantially free" means a content of halohydrocarbons within the common aliphatic medium of less than 2 wt.-%, preferably less than 1 wt.-%, more preferably less than 0.1 wt.-% and even more preferably absence of halohydrocarbons.

The preferred ratio of monomers to a hydrocarbon solvent is not calculable in advance, but can, however, easily determined by very few routine experiments. Although increasing the amount of monomers should reduce solution viscosity, making accurate theoretical predictions of the extent of that reduction is not feasible due in part to the complex effect on viscosity of the interaction of various components of the solution at the concentrations and temperatures employed in the process.

In one embodiment, the process temperature is in the range of −100° C. to −40° C., preferably in the range of −95° C. to −65° C., more preferably in the range of −85° C. to −75° C., yet more preferably in the range of −80° C. to −75° C.

Although higher temperatures are desirable in that energy usage for refrigeration and pumping (due to lower viscosity at higher temperature) are reduced, this generally leads to lower molecular weight polymers that are not as commercially desirable. However, due to the use of high monomer to solvent ratios in the present invention, a reduced but still acceptable molecular weight can be obtained with higher temperatures.

Therefore, in an alternative embodiment, temperatures in the range of −50° C. to lower than −75° C., preferably −55° C. to −72° C., more preferably −59° C. to −70° C., yet more preferably −61° C. to −69° C., are used while still obtaining the desired molecular weight of butyl rubber.

The weight average molecular weight of butyl rubber polymers produced using the processes according to the invention, as measured prior to bromination, typically is in the range of 200 to 1000 kg/mol, preferably 200 to 700 kg/mol, more preferably 325 to 650 kg/mol, even more preferably 350 to 600 kg/mol, yet more preferably 375 to 550 kg/mol, even more preferably 400 to 500 kg/mol. If not mentioned otherwise, molecular weights are obtained using gel permeation chromatography in tetrahydrofuran (THF) solution using polystyrene molecular weight standards.

The viscosity of the solution at the discharge of reactor 40 is typically and preferably less than 2000 cP, preferably less than 1500 cP, more preferably less than 1000 cP. A most preferred range of viscosity is from 500 to 1000 cP. If not mentioned otherwise, viscosities are, if not mentioned otherwise, viscosities were measured in a rotational rheometer of cone-plate type (Haake). All given viscosities refer to the extrapolated zero shear viscosity.

The solids content of the solution obtained following polymerization is preferably in the range of from 3 to 25%, more preferably 10 to 20%, even more preferably from 12 to 18%, yet more preferably from 14 to 18%, even more preferably from 14.5 to 18%, still more preferably 15 to 18%, most preferably 16 to 18% by weight. As described previously, higher solids contents are preferred, but entail increased solution viscosity. The higher monomer to solvent ratios used in the present process allow higher solids contents to be achieved than in the past and advantageously also permit use of a common aliphatic medium for both polymerization and bromination.

As used herein the term "solids content" refers to weight percent of the polymer obtained according to step b) i.e. in polymerization and present in the rubber solution.

In step c), un-reacted residual monomers are removed from the solution following polymerization preferably using a distillation process. Distillation processes to separate liquids of different boiling points are well known in the art and are described in, for example, the *Encyclopedia of Chemical Technology*, Kirk Othmer, 4th Edition, pp. 8-311, which is incorporated herein by reference.

The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the common aliphatic medium from the monomers is not as critical and contents of for example up to 10 wt.-% of components of the common aliphatic medium are acceptable in the overhead stream from the distillation process. In a preferred embodiment the contents of components of the common aliphatic medium in the overhead stream from the distillation process are less than 5 wt.-%, more preferably less than 1 wt.-%.

With reference to FIG. 1, the process of the present invention preferably includes purification of the unreacted monomers separated from the polymerization solution using the distillation column 60. A purification unit 100 may be provided for this purpose; alternatively, purification can take place offsite in a separate purification unit. The purified monomers are normally recycled back into the process and mixed with fresh monomers; however, they may alternatively be utilized in a different process or sold separately. Preferred embodiments of the process include these optional purification and recycling steps in order to achieve advantageous overall process economics.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis. The proportion of monomers that are available for recycle depends on the degree of conversion obtained during the polymerization process. For example, taking a ratio of monomer to common aliphatic medium of 66:34, if the solids level in the rubber solution produced is 10%, then 85% of the monomers are available to be returned in the recycle stream. If the solids level is increased to 18%, then 73% of the monomers are available for recycle.

Following removal of the un-reacted residual monomers, the butyl polymer is brominated In step d). The brominated butyl rubber is produced using solution phase techniques. A "cement" comprising a solution of the butyl rubber dissolved in the common aliphatic medium used during the polymerization step is treated with a bromination agent which is either used in absence or presence of a reoxidation agent.

Suitable reoxidizing agents include peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perunanic, perboric, perphosphoric, perpyrophosphoric, persulfates, perchloric, perchlorate and periodic acids or mixtures of the aforementioned oxidation agents.

Supplemental solvent, for example comprising fresh common aliphatic medium, and/or water may be added to the separated rubber solution in order to form a cement having the desired properties for bromination.

Bromination in the common aliphatic medium used during the polymerization step advantageously saves energy as compared with the conventional slurry process by eliminating the need for separating the polymer from the polymerization medium, then re-dissolving it in a different medium for bromination.

Preferably, the amount of brominating agent is in the range of from about 0.1 to about 20%, preferably in the range of 0.1 to 8%, even more preferably from about 0.5% to about 4%, yet even more preferably from about 0.8% to about 3%, even still more preferably from about 1.5% to about 2.5% and most preferably even more preferably from 1.5 to 2.5% by weight of the polymer.

In another embodiment the quantity of brominating agent is 0.2 to 1.2 times the molar quantity of double bonds contained in the butyl polymer, preferably 0.8 to 1.2 times the molar quantity.

The bromination agent may comprise elemental bromine ($Br_2$), interhalogens such as bromine chloride (BrCl) and/or organo-halide precursors thereto, for example dibromo-dimethyl hydantoin, N-bromosuccinimide, or the like. The most preferred bromination agent comprises bromine. Even more preferably bromine is used as brominating agent.

The bromination process may be operated at a temperature of from 10° C. to 90° C., preferably from 20° C. to 80° C. and the reaction time may be from 1 to 10 minutes, preferably from 1 to 5 minutes. The pressure in the bromination reactor may be from 0.8 to 10 bar.

The amount of bromination during this procedure may be controlled so that the final polymer has the preferred amounts of bromine described hereinabove. The specific mode of attaching the halogen to the polymer is not particularly restricted and those of skill in the art will recognize that modes other than those described above may be used while achieving the benefits of the invention. For additional details and alternative embodiments of solution phase bromination processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300, which are incorporated herein by reference.

According to step e) the brominated butyl rubber polymer obtained in step d) is reacted with at least one nitrogen and/or phosphorous containing nucleophile.

After completion of the bromination reaction in step d), the polymer may be recovered by conventional methods, e.g., neutralization with dilute caustic, water washing and removal of solvent such as by steam stripping or precipitation using a lower alcohol such as isopropanol, followed by drying.

Quaternization and ionomer formation can readily accomplished by reactive kneading which can, for example, be performed in an internal mixer, at a temperature and residence time sufficient to carry out the reaction. Alternatively, the reaction may be carried out in solution optionally under elevated pressure and temperature.

Where solution techniques are applied it is preferred to neutralize the rubber solution comprising the bromobutyl rubber polymer and the common aliphatic medium obtained in step d) with an aqueous basic material, for example a diluted aqueous solution of sodium hydroxide, to separate the organic phase comprising the bromobutyl rubber polymer and the common aliphatic medium obtained thereby and to react said solution, optionally after an additional drying step, with at least one nitrogen and/or phosphorous containing nucleophile As used herein the term "nucleophile" denotes a compound having a lone electron pair located on nitrogen or phosphorous which is capable of forming a covalent bond to form phosphonium or ammonium ions.

Preferred nitrogen and/or phosphorous containing nucleophiles are those of formula $$AR^1R^2R^3 \qquad (I)$$

wherein
A denotes nitrogen or phosphorus and
$R^1$, $R^2$ and $R^3$ are independently of each other selected from the group consisting of $C_1$-$C_{18}$-alkyl, $C_6$-$C_{15}$-arylalkyl or $C_5$-$C_{14}$-aryl.

$C_1$-$C_{15}$-alkyl denotes a straight-chain, cyclic, branched or unbranched alkyl radical which may optionally be further substituted by hydroxyl or alkoxy groups. The same applies to the alkyl moiety of an $C_6$-$C_{15}$-arylalkyl radical.

$C_5$-$C_{14}$-aryl not only denotes carbocyclic radicals but also heteroaromatic radicals in which zero, one, two or three carbon atoms of each aromatic each ring, but at least one carbon atom in the whole radical, is replaced by a heteroatom selected from the group of nitrogen, sulphur or oxygen.

Alkoxy denotes a straight-chain, cyclic or branched or unbranched alkoxy radical.

Preferred nucleophiles of formula (I) are those wherein two or three of the residues $R^1$, $R^2$ and $R^3$ are identical.

More preferred nucleophiles of formula (I) are: trimethylamine, triethylamine, triisopropylamine, tri-n-butylamine, trimethylphosphine, triethylphosphine, tri isopropylphosphine, tri-n-butylphosphine, triphenylphosphine 2-dimethylaminoethanol, 1-dimethylamino-2-propanol, 2-(isopropylamino)ethanol, 3-dimethylamino-1-propanol, N-methyldiethanolamine, 2-(diethylamino)ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)diethanol, tris[2-(2-methoxyethoxy)ethyl]amine, 3-(dibenzylamino)-1-propanol or mixtures of the aforementioned nucleophiles.

The amount of nucleophile reacted with the bromobutyl rubber obtained in step c) is for example in the range from 0.05 to 5 molar equivalents, more preferable from 0.1 to 4 molar equivalents and even more preferably from 0.2 to 3 molar equivalents based on the total molar amount of allylic halide present in the bromobutyl polymer.

The brominated polymer and the nucleophile can for example be reacted for about 0.5 to 90 minutes.

In another embodiment, the nanocomposite is produced in situ by reaction of the brominated with at least one nitrogen and/or phosphorous based nucleophile in the presence of the filler.

In this case steps e) and f) are performed simultaneously.

Since the nucleophiles preferably react with an allylic bromide functionality of bromobutyl rubbers, the resulting ionomeric moiety is a repeating unit derived from an allylic bromide. The total content of ionomeric moiety in the butyl ionomer therefore cannot exceed the starting amount of allylic bromide in the bromobutyl polymer; however, residual allylic bromides and/or residual multiolefins may be present. According to the present invention the resulting ionomer could also be a mixture of the polymer-bound ionomeric moiety and allylic halide such that the total molar amount of ionomeric moiety and allylic halide functionality are present in the range of 0.05 to 20.0 mol %, more preferably from 0.2 to 1.0 mol % and even more preferably from 0.5 to 0.8 mol % with residual multiolefin being present in the range from 0.2 to 5 mol % and even more preferably from 0.5 to 0.8 mol %. Residual allylic bromides may be present in an amount of from 0.1. mol % up to an amount not exceeding the original allylic bromide content of the bromobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is at least 0.4 mol %, preferably at least 0.6 mol %, more preferably at least 1.0 mol %, yet more preferably at least 2.0 mol %, still more preferably at least 3.0 mol %, even more preferably at least 4.0 mol %.

In an embodiment of the invention the fillers are selected from the group of high aspect ratio fillers.

As used herein the term "high aspect ratio" means an aspect ratio of at least 1:3, whereby the aspect ratio is defined as the ratio of mean diameter of a circle of the same area as the face of the plate to the mean thickness of the plate. The aspect ratio for needle and fiber shaped fillers is the ratio of length to diameter.

The fillers may include acircular or nonisometric materials with a platy or needle-like structure. Preferable high aspect ratio fillers have an aspect ratio of at least 1:5, more preferably at least 1:7, yet more preferably from 1:7 to 1:250. Fillers in accordance with the present invention have a mean particle size in the range of from 0.001 to 100 microns, preferably between 0.005 and 50 microns and more preferably between 0.01 and 10 microns.

A suitable filler has a BET surface area, measured in accordance with DIN (Deutsche Industrie Norm) 66131, of 5 to 200 square meters per gram.

In a preferred embodiment the high aspect ratio fillers are selected from the group consisting of nanoclays, preferably an organically modified nanoclay. The present invention is not limited to a specific nanoclay; however, natural powdered smectite clays, such as sodium or calcium montmorillonite, or synthetic clays such as hydrotalcite and laponite are preferred as starting materials. Organically modified montmorillonite nanoclays are especially preferred. The clays are preferably modified by substitution of the transition metal for an onium ion, as is known in the art, to provide surfactant functionality to the clay that aids in the dispersion of the clay within the generally hydrophobic polymer environment. Preferred onium ions are phosphorus based (eg: phosphonium ions) and nitrogen based (eg: ammonium ions) and contain functional groups having from 2 to 20 carbon atoms (eg: $NR_4^{+-}$ MMT).

The clays are preferably provided in nanometer scale particle sizes, preferably less than 25 µm by volume, more preferably from 1 to 50 µm, still more preferably from 1 to 30 µm, yet more preferably from 2 to 20 µm.

In addition to silica, the preferred nanoclays may also contain some fraction of alumina. The nanoclays may contain from 0.1 to 10 wt % alumina, preferably 0.5 to 5 wt %, more preferably 1 to 3 wt % alumina.

Examples of preferred commercially available organically modified nanoclays suitable for use as high aspect ratio fillers according to the present invention are sold under the tradenames Cloisite® clays 10A, 20A, 6A, 15A, 30B, or 25A. Other examples of high aspect ratio fillers include Polyfil 80™, Mistron Vapor™, Mistron HAR™, Mistron CB™ as well as hydrotalcite clays such as Perkalite LD, or Perkalite F100.

The high aspect ratio fillers are present in the nanocomposite in an amount of from 1 to 80 phr, more preferably from 2 to 20 phr, yet more preferably from 5 to 10 phr.

The nanocomposite may be formed by adding the filler to the bromobutyl rubber before reaction to form the ionomer, thereby creating an in situ ionomer nanocomposite, or may be formed by adding the filler to a pre-formed ionomer using conventional compounding techniques. Alternatively, the ionomer can be formed in situ followed by addition of the nanoclay in solution to form the ionomer nanocomposite.

The ingredients of the nanocomposite may be mixed together using, for example, an internal mixer, such as a Banbury mixer, a miniature internal mixer, such as a Haake or Brabender mixer, or a two roll mill mixer. However, care should be taken so that no unwanted pre-crosslinking (also known as scorch, a pre-cursor to gel formation) occurs during the mixing stage. For further information on compounding techniques, see Encyclopedia of Polymer Science and Engineering, Vol. 4, p. 66 et seq. (Compounding).

In a further step g) the nanocomposite obtained according to step f) may be cured for example using conventional curing systems such as sulphur, resin and peroxide.

The preferred curing system is sulphur based. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight butyl polymer in the nanocomposite. Elemental sulfur, comprising component (ii) of the preferred curing system is typically used in amounts of from about 0.2 to about 10 parts by weight per hundred parts by weight butyl polymer in the composition. Suitable sulfur-based accelerators (component (iii) of the preferred curing system) are typically used in amounts of from about 0.5 to about 3 parts by weight, per hundred parts by weight butyl polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on rubber.

Further information on vulcanization processes may be obtained in Encyclopedia of Polymer Science and Engineering, Vol. 17, s. 666 et seq. (Vulcanization).

The cured nanocomposites may be used as a part of a tire including, but not limited to an inner liner, tread, sidewall, an adhesive, as part of a thermoplastic elastomer, footwear, storage membranes, protective clothing, pharmaceutical stoppers, linings, and barrier coatings.

EXAMPLES

Example 1

Polymerization and Distillation

Key elements of the process described in FIG. 1 have been operated at pilot scale with reactors of 2 liter total capacity running in a continuous mode. Feeds to the reactors were 3.87 kg/h of isobutene, 0.09 kg/h of isoprene and 2.0 kg/h of hexane giving a monomer/common aliphatic medium mass ratio of 66:34. The reaction temperature used was −65° C. and a solution having a solids content of 16 wt % was produced. This material had a weight average molecular weight of about 440 kg/mol and an isoprene content of about 1.7 mol-%. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and about 1% of components of the common aliphatic medium in the overhead monomer stream. The separated monomers were purified, then re-introduced to the solution polymerization reactor. The separated rubber solution in the common aliphatic medium was such that bromination could be accomplished by conventional means with addition of supplemental common aliphatic medium.

The common aliphatic medium used is commercially available and contained 97.5 wt.-% aliphatic hydrocarbons having a boiling point in the range of 45° C. to 80° C. at a pressure of 1013 hPa the rest being aliphatic hydrocarbons having a boiling point of less than 45° C. or more then 80° C. at a pressure of 1013 hPa.

Example 2

Halogenation

The separated rubber solution of Example 1 was halogenated using pilot scale bromination equipment. Supplemental common aliphatic medium in an amount of 10% was added to the separated rubber solution in order to lower the viscosity. A brominated butyl polymer containing 1.6% bromine is produced in the separated rubber solution. The halogenated separated rubber solution is then finished using conventional drying and finishing techniques.

Example 3

Preparation of Phosphonium Ionomer Nanocomposite

In a 2 L Parr reactor, 100 g bromobutyl rubber of Example 2 is dissolved in 1000 mL of hexanes. To this, 4 g of triphenylphosphine and 10 g of nanoclay (Cloisite™ 15A) is added and allowed to react for 60 min at a temperature of 100° C. The polymer cement is coagulated in ethanol and the resulting polymer nanocomposite is dried and analyzed by $^1$H and $^{31}$P NMR. A high ionomer content was confirmed. Nanoclay exfoliation was confirmed by X-ray diffraction analysis.

Example 4

Preparation of Ammonium Ionomer Nanocomposite

In a 2 Parr reactor, 100 g bromobutyl rubber of Example 2 is dissolved in 1000 mL of hexanes. To this, 3.2 g of N,N-dimethylaminoethanol and 10 g of nanoclay (Cloisite™ 15A) is added and allowed to react for 60 min at a temperature of 100° C. The polymer cement is coagulated in ethanol and the resulting polymer nanocomposite is dried and analyzed by $^1$H NMR. A high ionomer content was confirmed. Nanoclay exfoliation was confirmed by X-ray diffraction analysis.

The foregoing describes only certain preferred embodiments and other features and aspects of the invention will be evident to persons skilled in the art. Variants or equivalents of described elements that function in the same way may be substituted without affecting the way in which the invention works. All sub-combinations of the described features are intended by the inventor to be encompassed by the following claims.

The invention claimed is:

1. A process for the preparation of polymer nanocomposites comprising:
    a) providing a reaction medium comprising
        a common aliphatic medium comprising at least 50 wt.-% of one or more aliphatic hydrocarbons having a boiling point of 45° C. to 80° C. at a pressure of 1013 hPa, and
        a monomer mixture comprising at least one monoolefin monomer, at least one multiolefin monomer and either no or at least one other co-polymerizable monomer in a mass ratio of monomer mixture to common aliphatic medium of 40:60 to 95:50;
    b) polymerizing the monomer mixture within the reaction medium to form a rubber solution comprising a rubber polymer which is at least substantially dissolved in the medium comprising the common aliphatic medium and residual monomers of the monomer mixture;
    c) separating residual monomers of the monomer mixture from the rubber solution to form a separated rubber solution comprising the rubber polymer and the common aliphatic medium;
    d) brominating the rubber polymer in the separated rubber solution to obtain a solution comprising the brominated rubber polymer and the common aliphatic medium;
    e) reacting the brominated rubber polymer obtained in step d) with at least one nitrogen and/or phosphorous containing nucleophile; and
    f) adding a filler to the ionomer obtained in step e), and mixing the filler and the ionomer to form an uncured nanocomposite.

2. The process according to claim 1, wherein the rubber polymer is a butyl rubber.

3. The process according to claim 2 wherein the weight average molecular weight of butyl rubber, as measured prior to bromination, is 200 kg/mol to 1000 kg/mol.

4. The process according to claim 1 wherein ft monomer mixture comprises 80.0% to 99.9% by weight of at least one monoolefin monomer and 0.1% to 20.0% by weight of at least one multiolefin monomer.

5. The process according to claim 1 wherein the monoolefin monomer is isobutene and the multiolefin monomer is isoprene.

6. The process according to claim 1 wherein the common aliphatic medium comprises at least 80 wt.-% of one or more aliphatic hydrocarbons having a boiling point of 45° C. to 80° C. at a pressure of 1013 hPa.

7. The process according to claim 1 wherein the polmerizing of step b) is conducted at a process temperature of −100° C. to −40° C.

8. The process according to claim 1 further comprising conducting the reaction in a polymerization reactor, and wherein the viscosity of the solution at the discharge of the polymerization reactor is less than 2000 cP.

9. The process according to claim 1 wherein the rubber solution obtained in step b) has a solids content of 3 to 25%.

10. The process according to claim 1 wherein the brominating comprises brominating the rubber polymer in the presence of molecular bromine as a brominating agent.

11. The process according to claim 10 further comprising using an amount of brominating agent of 0.1 to 20% by weight of the rubber.

12. The process according to claim 11 further comprising using the brominating agent in combination with an oxidizing agent.

13. The process according to claim 1 wherein the nitrogen and/or phosphorous containing nucleophiles are those of formula I $$AR^1R^2R^3 \qquad \text{(I), wherein:}$$

A denotes nitrogen or phosphorus, and
$R^1$, $R^2$ and $R^3$ are, independently of each other, selected from the group consisting of $C_1$-$C_{18}$-alkyl, $C_6$-$C_{15}$-arylalkyl or $C_5$-$C_{14}$-aryl.

14. The process according to claim 1 wherein further comprising conducting steps e) and f) simultaneously.

15. The process according to claim 1 wherein the fillers are selected from the group of high aspect ratio fillers.

16. The process according to claim 1 wherein the filler has a BET surface area, measured in accordance with DIN (Deutsche Industrie Norm) 66131, of 5 to 200 square meters per gram.

17. The process according to claim 1 further comprising curing the uncured nanocomposite.

* * * * *